United States Patent
Lim et al.

(10) Patent No.: US 8,222,865 B2
(45) Date of Patent: Jul. 17, 2012

(54) HYBRID BATTERY PACK AND METHODS OF CHARGING AND DISCHARGING THE SAME

(75) Inventors: Seong Ben Lim, Yongin-si (KR); Hong Seok Choi, Yongin-si (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 0 days.

(21) Appl. No.: 12/691,086

(22) Filed: Jan. 21, 2010

(65) Prior Publication Data

US 2010/0117592 A1 May 13, 2010

Related U.S. Application Data

(62) Division of application No. 11/832,207, filed on Aug. 1, 2007, now Pat. No. 7,728,547.

(30) Foreign Application Priority Data

Aug. 22, 2006 (KR) .................................. 2006-79513

(51) Int. Cl.
  *H02J 7/00* (2006.01)
(52) U.S. Cl. ............. 320/124; 320/126; 320/134; 429/9
(58) Field of Classification Search ........................ 429/9
  See application file for complete search history.

(56) References Cited

U.S. PATENT DOCUMENTS

| | | | |
|---|---|---|---|
| 6,021,332 A | 2/2000 | Alberth, Jr. et al. | |
| 6,452,362 B1 | 9/2002 | Choo | |
| 7,494,729 B2 * | 2/2009 | Odaohhara | 429/9 |
| 7,518,338 B2 | 4/2009 | Wang et al. | |
| 7,579,811 B2 * | 8/2009 | Sato et al. | 320/134 |
| 2004/0201365 A1 * | 10/2004 | Dasgupta et al. | 320/116 |
| 2005/0116686 A1 * | 6/2005 | Odaohhara | 320/116 |
| 2005/0134230 A1 * | 6/2005 | Sato et al. | 320/136 |

FOREIGN PATENT DOCUMENTS

| | | |
|---|---|---|
| JP | 2005-168103 | 6/2005 |
| KR | 10-2006-0011484 | 2/2006 |

OTHER PUBLICATIONS

U.S. Appl. No. 11/832,207, filed Aug. 1, 2007, Seong Ben Lim, et al., Samsung SDI Co., Ltd.

* cited by examiner

*Primary Examiner* — Ramy Ramadan

(74) *Attorney, Agent, or Firm* — Knobbe Martens Olson & Bear, LLP

(57) ABSTRACT

A hybrid battery pack and methods of charging and discharging the same make it possible to manage at least two power sources by one circuit. The hybrid battery pack includes a first power source having a first switching circuit, a second power source connected to the first power source in parallel and having a second switching circuit, a current sensor serially connected to the first and second power sources to sense the currents of the first and second power sources, and a controller to obtain the voltages of the first and second power sources so that the first and second power sources are not overcharged or over-discharged and to calculate the entire capacity of the first and second power sources using the amount of currents obtained by the current sensor.

17 Claims, 4 Drawing Sheets

HYBRID BATTERY PACK AND METHODS OF CHARGING AND DISCHARGING THE SAME

CROSS-REFERENCE TO RELATED APPLICATION

This application is a divisional of U.S. patent application Ser. No. 11/832,207, filed on Aug. 1, 2007, now U.S. Pat. No. 7,728,547, which claims the benefit of Korean Patent Application No. 10-2006-0079513, filed Aug. 22, 2006 in the Korean Intellectual Property Office, the disclosures of which are incorporated herein by reference.

BACKGROUND OF THE INVENTION

1. Field of the Invention

Aspects of the present invention relate to a hybrid battery pack and methods of charging and discharging the same, and more particularly, to a hybrid battery pack that is capable of accommodating at least two power sources having different shapes, chemical characteristics, capacities, and/or charging voltages, and at the same time, capable of managing and controlling the power sources using one circuit, and methods of charging and discharging the same.

2. Description of the Related Art

In general, when portable electronic apparatuses receive power of chargeable power sources, the usable time of the portable electronic apparatuses are determined by the amount of time the power source can supply power. Therefore, in order to increase the usable time of the portable electronic apparatuses, the power sources must be constantly in a charged state.

In order to maximize the usable time of the portable electronic apparatuses, a method of mounting two power sources in one portable electronic apparatus is known. For example, two power sources of the same type having the same size and chemical characteristic are provided to be mounted in one portable electronic apparatus.

However, in such a method, circuits for controlling charging and discharging of the power sources must be provided in the power sources, respectively. Also, fuel gauge circuits or microcomputers for calculating the capacities of the power sources are provided, respectively. Accordingly, the price of the power sources increases.

Furthermore, in a conventional method, when battery cells having the same shape and chemical characteristic are used, additional space is required by the power sources. Accordingly, the energy efficiency ratio per volume deteriorates.

SUMMARY OF THE INVENTION

Accordingly, aspects of the present invention have a hybrid battery pack that is capable of accommodating at least two power sources having different shapes, chemical characteristics, capacities, and/or charging voltages and, at the same time, capable of managing and controlling the power sources using one circuit, and methods of charging and discharging the same.

According to aspects of the present invention, a hybrid battery pack includes a first power source having a first switching circuit, a second power source connected to the first power source in parallel and having a second switching circuit, a current sensor serially connected to the first and second power sources to obtain the currents of the first and second power sources, and a controller to obtain the voltages of the first and second power sources so that the first and second power sources are not over-charged or over-discharged and to calculate the entire capacity of the first and second power sources using the amount of currents obtained by the current sensor.

The first power source and/or the second power source can include a fuel cell, a solar cell, a cylinder type lithium ion battery, a polygon type lithium ion battery, a pouch type lithium polymer battery, and/or a pouch type lithium ion battery.

The first power source and the second power source can include battery cells having different shapes, chemical characteristics, capacities, and/or charging voltages.

The controller can output a charging stop signal to the respective switching circuit when the voltage of the first power source or the second power source is an over-charging voltage so that the respective switching circuit stops the first power source or the second power source from being charged.

The controller can output a discharging stop signal to the respective switching circuit when the voltage of the first power source or the second power source is an over-discharging voltage so that the respective switching circuit stops the first power source or the second power source from being discharged.

The controller can obtain the temperatures of the first power source or the second power source to output the charging stop signal or the discharging stop signal to the respective switching circuits when the sensed temperatures are no less than an allowed temperature so that the respective switching circuit stops the first power source or the second power source from being charged or discharged.

The first switching circuit of the first power source can sense a current from the current sensor to stop the first power source from being charged or discharged during occurrence of an over-current.

The second switching circuit of the second power source can sense a current from the current sensor to stop the second power source from being charged or discharged during occurrence of an over-current.

The first power source can further include an auxiliary switching circuit so that a fuse provided in a charging and discharging path is cut off during the over-charging.

The second power source can further include an auxiliary switching circuit so that a fuse provided in a charging and discharging path is cut off during the over-charging.

The controller can sum the capacity information of the first power source and the capacity information of the second power source to transmit the summation to an external system using a communication line.

In the first power source, a charging switch and a discharging switch can be serially connected to a charging and discharging path and the switches can be turned on and off by the first switching circuit.

In the second power source, a charging switch and a discharging switch can be serially connected to a charging and discharging path and the switches can be turned on and off by the second switching circuit.

According to aspects of the present invention, a method of controlling a hybrid battery pack including at least two power sources and a controller to control power supplied from a charging circuit to charge the hybrid battery pack without interruption, the method including intercepting the charging paths of all power sources, stopping generation of a charging current, requesting controller information on one of the power sources to be charged, selecting the power source to be charged and connecting the selected power source to the charging circuit to secure a charging path; transmitting information on the selected power source to be charged and a charging preparation completion signal to the charging circuit, and generating a charging current.

According to aspects of the present invention, a hybrid battery pack including at least two power sources and a controller to control the power supplied to a load to discharge the hybrid battery pack, without interruption, the method including intercepting a charging path of one of the power sources to be stopped from being discharged with respect to the load, intercepting a charging path of the other power source to be newly discharged with respect to the load, connecting the other power source to be newly discharged to the load to secure a discharging path, and intercepting the discharging path of the power source to be stopped from being discharged from the load.

The controller can simultaneously connect the discharging paths of the two power sources to the load for a predetermined time when the discharging paths are changed from the one power source to the other power source with respect to the load.

According to aspects of the present invention, a battery pack includes: a first rechargeable cell to supply power; a second rechargeable cell to supply power, and which is of a different type from the first rechargeable cell; a first switching unit to control supply of power to and/or from the first rechargeable cell; a second switching unit to control supply of power to and/or from the second rechargeable cell, and which is parallel to the first switching unit; and a controller to control the first and second switching units to supply power from the first and second rechargeable cells without interruption.

As described above, according to aspects of the present invention, since the power sources having different shapes, chemical characteristics, capacities, and/or charging voltages are accommodated or usable, it is possible to overcome or minimize limitations on a space of the hybrid battery pack and to maximize the energy efficiency ratio per volume of the hybrid battery pack.

According to aspects of the present invention, since one controller can simultaneously manage at least two power sources, the capacities of the two power sources can be calculated, respectively, and the calculated capacities are added to an external system. Accordingly, it is possible to minimize the number of circuit elements and to correctly know or determine the capacities of all the power sources of the hybrid battery pack.

According to aspects of the present invention, although the shapes, the chemical characteristics, the capacities, and/or the charging voltages of the two power sources are different from each other, information on the shapes, the chemical characteristics, the capacities, and the charging voltages of the power sources to be charged during the charging operation are transmitted to a charging circuit (for example, a charging capacity rate (C-rate)) of and the charging circuit supplies a suitable charging current based on the information of the power sources to be charged so that the two different kinds of power sources can be easily charged.

According to aspects of the present invention, when one of the two power sources is stopped from being discharged and the other power source is to be discharged, the discharging paths of the two power sources are connected to each other for a predetermined time so that it is possible to minimize or prevent the supply of power to the external system from being stopped or interrupted.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Figure 1:
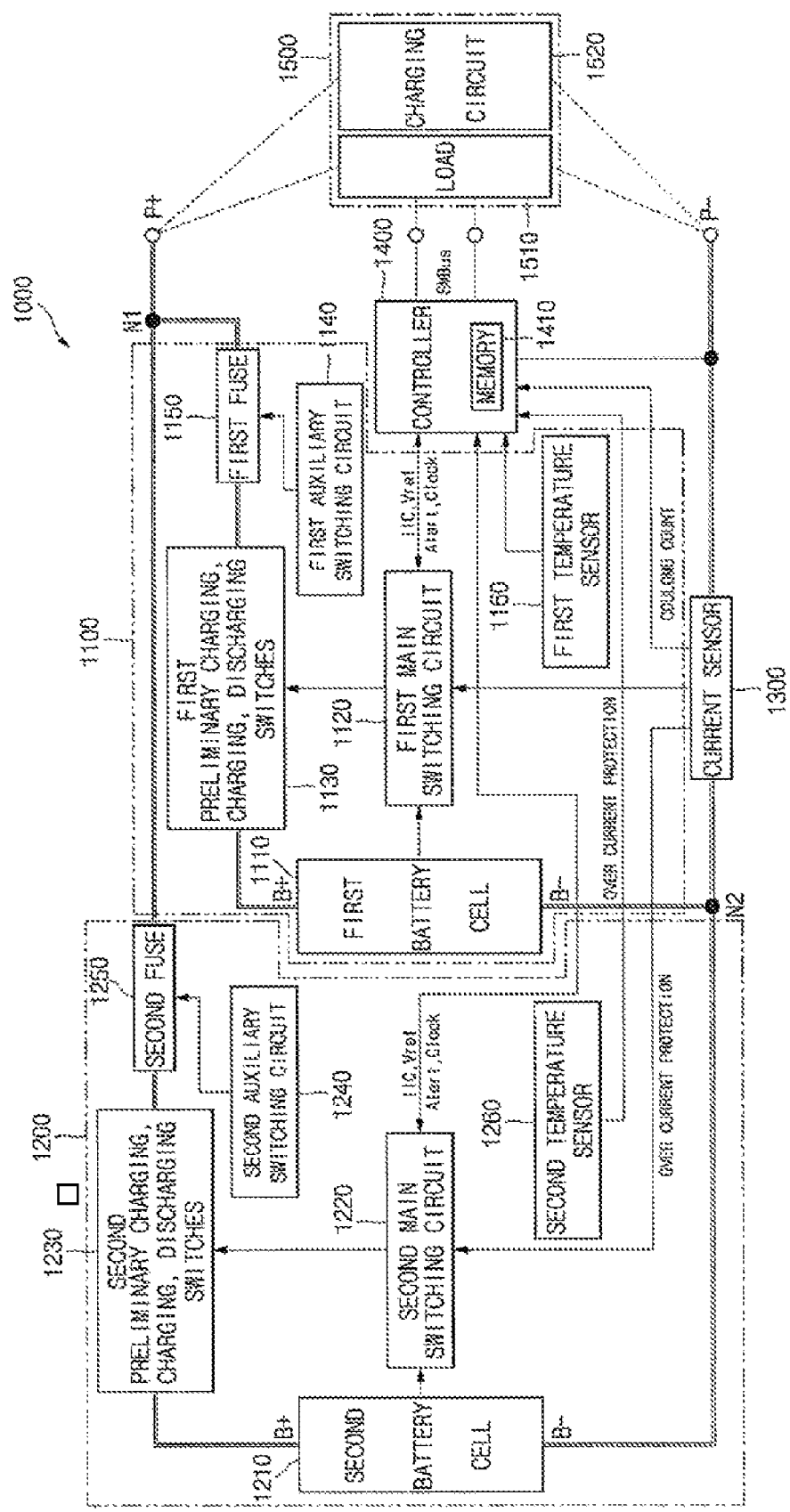
FIG. 1 is a block diagram illustrating the structure of a hybrid battery pack according to an aspect of the present invention.

Reference will now be made in detail to the aspects of the present invention, examples of which are illustrated in the accompanying drawings, wherein like reference numerals refer to the like elements throughout. The aspects are described below in order to explain the present invention by referring to the figures.

FIG. 1 is a block diagram illustrating the structure of a hybrid battery pack 1000 according to an aspect of the present invention.

As illustrated in FIG. 1, the hybrid battery pack 1000 includes a first power source 1100, a second power source 1200, a current sensor 1300, and a controller 1400.

The first power source 1100 includes a first battery cell 1110, a first main switching circuit 1120, first preliminary charging, charging, and discharging switches (a first switching unit) 1130, a first auxiliary switching circuit 1140, a first fuse 1150, and a first temperature sensor 1160. In the first battery cell 1110, at least one fuel cell, solar cell, or secondary battery that can be charged and discharged are connected to each other in series or/and in parallel. For example, the secondary battery can be a cylinder type lithium ion battery, a polygon type lithium ion battery, a pouch type lithium polymer battery, a pouch type lithium ion battery, or an equivalent, cells thereof, and/or any combinations thereof. However, the type of the usable secondary battery is not limited.

The first main switching circuit 1120 senses the charging voltage or the discharging voltage of the first battery cell 1110 to transmit the value to the controller 1400. The first main switching circuit 1120 turns on or off the switches of the first preliminary charging, charging, and discharging switches (the first switching unit) 1130 by the control signals (that is, a charging stop signal, a charging start signal, a discharging stop signal, a discharging start signal, and/or any combinations thereof) of the controller 1400. Furthermore, the first main switching circuit 1120 senses a current signal from the current sensor 1300 to turn off the first preliminary charging, charging, and discharging switches 1130 when the sensed resultant value of the current signal is determined as corresponding to an over-current. A basic coupling relationship between the first main switching circuit 1120 and the first preliminary charging, charging, and discharging switches 1130 will be described in detail hereinafter.

The first preliminary charging, charging, and discharging switches 1130 can be three switches serially connected to each other on a charging and discharging path between the positive electrode terminal B+ of the first battery cell 1110 and a pack positive electrode terminal P+ of the hybrid battery pack 1000. The first preliminary charging, charging, and discharging switches (first switching unit) 1130 are turned on and off by the control signals of the first main switching circuit 1120. In other aspects, the first preliminary charging switch need not be provided so that only the charging and the discharging switches are provided in the first switching unit 1130.

The first auxiliary switching circuit 1140 cuts off (triggers or "blows") the first fuse 1150 to intercept (interrupt or cut off) the charging and discharging path when the first main switching circuit 1120 or the first preliminary charging, charging, and discharging switches 1130 do not operate normally.

The first fuse 1150 is serially connected to a charging and discharging path between the first preliminary charging, charging, and discharging switches 1130 and the pack positive electrode terminal P+. Once the above described first fuse 1150 is cut off (triggered or "blown") by the control signals of the first auxiliary switching circuit 1140, it is not recovered (usable) again and needs replacing.

The first temperature sensor 1160 senses the temperature of the first battery cell 1110 (connection not shown) to output the sensed temperature to the controller 1400. The controller 1400 outputs the charging or discharging stop signal to the first main switching circuit 1120 so that the first main switching circuit 1120 turns off at least one of the switches of the first preliminary charging, charging, and discharging switches 1130 and that the charging and discharging path is intercepted (interrupted or cut off) when the temperature obtained by the first temperature sensor 1160 is no less than (or at least as high as) an allowed temperature. The controller 1400 can use the temperature sensed by the first temperature sensor 1160 to correct (balance) the capacities of the power sources. Since a method of correcting (balancing) the capacities of the power sources in accordance with the temperature is well known to those skilled in the art, description thereof will be omitted.

The second power source 1200 includes a second battery cell 1210, a second main switching circuit 1220, second preliminary charging, charging, and discharging switches (a second switching unit) 1230, a second auxiliary switching circuit 1240, a second fuse 1250, and a second temperature sensor 1260. In the second battery cell 1210, at least one secondary battery that can be charged and discharged are connected to each other in series or/and in parallel. For example, the secondary battery can be a cylinder type lithium ion battery, a polygon type lithium ion battery, a pouch type lithium polymer battery, a pouch type lithium ion battery, or an equivalent, cells thereof, and/or any combination thereof. However, the type of the usable secondary battery is not limited.

Here, the shape, the chemical characteristic, the capacity, the charging voltage, and/or the charging current of the first battery cell 1110 of the first power source 1100 can be different from the shape, the chemical characteristic, the capacity, the charging voltage, and the charging current of the second battery cell 1210 of the second power source 1200. For example, if the first battery cell 1110 is a fuel cell or a solar cell, the second battery cell 1210 can be a lithium ion battery (such as a cylinder type lithium ion battery, a polygon type lithium ion battery, a pouch type lithium polymer battery, or a pouch type lithium ion battery) or the equivalent. If the first power source 1100 is the lithium based battery cell, the second battery cell 1210 can be a Ni—Cd battery, a Ni—H battery, or an equivalent. The capacity of the first power source 1100 can be different from the capacity of the second power source 1200. Furthermore, the charging voltage and the charging current of the first power source 1100 can be different from the charging voltage and the charging current of the second power source 1200.

The second main switching circuit 1220 senses the charging voltage or the discharging voltage of the second battery cell 1210 to transmit the result to the controller 1400. The second main switching circuit 1220 turns on or off the switches of the second preliminary charging, charging, and discharging switches 1230 by the control signals (that is, the charging stop signal, the charging start signal, the discharging stop signal, and the discharging start signal) of the controller 1400. Furthermore, the second main switching circuit 1220 senses the current signal from the current sensor 1300 to turn off the second preliminary charging, charging, and discharging switches 1230 when the sensed resultant value of the current signal is determined as corresponding to an over-current.

The second preliminary charging, charging, and discharging switches (the second switching unit) 1230 can be three switches serially connected to each other on a charging and discharging path between the positive electrode terminal B+ of the second battery cell 1210 and a pack positive electrode terminal P+ of the hybrid battery pack 1000. The second preliminary charging, charging, and discharging switches 1230 are turned on and off by the control signals of the second main switching circuit 1220. In other aspects, the second preliminary charging switch need not be provided so that only the charging and the discharging switches are provided in the second switching unit 1230.

The second auxiliary switching circuit 1240 cuts off (triggers or "blows") the second fuse 1250 when the second preliminary charging, charging, and discharging switches 1230 do not operate normally.

The second fuse 1250 is serially connected to a charging and discharging path between the second preliminary charging, charging, and discharging switches 1230 and the pack positive electrode terminal P+. Once the above described second fuse 1250 is cut off (triggered or "blown" by the control signals of the second auxiliary switching circuit 1240, it is not recovered (usable) again and needs replacing.

The second temperature sensor 1260 senses the temperature of the second battery cell 1210 (connection not shown) to output the sensed temperature to the controller 1400. The controller 1400 outputs the charging or discharging stop signal to the second main switching circuit 1220 so that the second main switching circuit 1220 turns off at least one of the switches of the second preliminary charging, charging, and discharging switches 1230 and that the charging and discharging path is intercepted when the temperature obtained by the second temperature sensor 1260 is no less than (or at least as high as) the allowed temperature. Furthermore, as described above, the controller 1400 can correct (or balance) the capacities of the power sources using the temperature sensed by the second temperature sensor 1260.

The second fuse 1250 (or the first fuse 1150) and the second auxiliary switching circuit 1240 (or the first auxiliary switching circuit 1140) need not be adopted as elements of all aspects of the present invention. That is, in various aspects, the first fuse 1150 (or the second fuse 1250) may be provided between a first node N1 and the pack positive electrode terminal P+ and where a program is set so that the first auxiliary switching circuit 1140 (or the second auxiliary switching circuit 1240) operates when the first main switching circuit 1120 or the second main switching circuit 1220 does not operate normally. In this aspect, the second fuse 1250 (or the first fuse 1150) and the second auxiliary switching circuit 1240 (or the first auxiliary switching circuit 1140) can be omitted.

In various aspects of the present invention, the first main switching circuit 1120 and the second main switching circuit 1220 may be implemented by a single switching circuit that receives signals from the controller 1400 and sends signals to both the first and second preliminary charging, charging, and discharging switches 1130 and 1230. Further, in other aspects, the first and second auxiliary switching circuits 1140 and 1240 may be implemented as a single auxiliary switching circuit, or implemented with the single switching circuit. In various aspects, many of the elements may be implemented by fewer elements.

In various aspects of the hybrid battery pack 1000, the current sensor 1300 is serially provided in a charging and discharging path between a node N2 and a pack negative electrode terminal P− of the hybrid battery pack 1000. The current sensor 1300 converts a voltage (voltage value) applied thereto into a current (current value) to transmit the current (current value) to the controller 1400, the first main switching circuit 1120, and the second main switching circuit 1220. As described above, the current sensor 1300 informs the first main switching circuit 1120 and the second main switching circuit 1220 whether an over-current is generated and, at the same time, allows the controller 1400 to calculate the amount of the over current.

In the aspect shown in FIG. 1, one current sensor 1300 is provided. However, in other aspects, three current sensors can be provided. For example, the current sensor 1300 can be provided between the negative electrode terminal B− of the first battery cell 1110 and a node N2, between the negative electrode terminal B− of the second battery cell 1210 and the node N2, and between the node N2 and the pack negative electrode terminal P−. When three of the current sensors 1300 are provided, it is possible to more correctly or accurately sense the amount of accumulated (or counted) over-current and the current that flow through each of the first battery cell 1110 and the second battery cell 1210. Also, it is possible to more correctly and accurately sense the amount of accumulated over-current and current that flow through both of the first battery cell 1110 and the second battery cell 1210.

The controller 1400 can be a fuel gauge integrated circuit (IC) (e.g., state of charge IC) or a microcomputer in which a memory 1410 such as a central processing unit (CPU), a random access memory (RAM), or a read only memory (ROM), where various input and output ports are provided. As described above, the controller 1400 obtains the voltage information of the first battery cell 1110 from the first main switching circuit 1120 of the first power source 1100, obtains the voltage information of the second battery cell 1210 from the second main switching circuit 1220 of the second power source 1200, and obtains current information (the amount of the accumulated (or counted) currents) from the current sensor 1300. Furthermore, the controller 1400 obtains information on the temperature of the first battery cell 1110 from the first temperature sensor 1160 of the first power source 1100 and obtains information on the temperature of the second battery cell 1210 from the second temperature sensor 1260 of the second power source 1200.

The controller 1400 performs a Coulomb count (current accumulation) based on the amount of the accumulated currents obtained by the current sensor 1300 to calculate the entire (total or combined) capacities and the remaining capacities of the first power source 1100 and the second power source 1200. Since the entire (total or combined) capacities and the remaining capacities of the power sources 1100 and 1200 can be calculated by various methods and are well-known to those skilled in the art, description of the methods of calculating the entire (total or combined) capacities and the remaining capacities of the power sources will be omitted.

In various aspects, the controller 1400 calculates the remaining capacity of the first power source 1100 and the remaining capacity of the second power source 1200, respectively, adds the remaining capacities of the two power sources to each other, and transmits the addition result to an external system 1500 (such as a load 1510) through a communication interface such as a system management bus (SMBus). Therefore, if one power source is connected through the external system 1500, such as the load 1510, it is possible to easily check the entire (total or combined) capacity of the power sources 1100 and 1200.

Also, the controller 1400 obtains charging voltage information and discharging voltage information from the first main switching circuit 1120 of the first power source 1100, outputs the charging stop signal to the first main switching circuit 1120 when the charging voltage is determined to be an over-charging voltage, and outputs the discharging stop signal to the first main switching circuit 1120 when the discharging voltage is determined to be an over-discharging voltage. The first main switching circuit 1120 turns off a first charging switch 1131 of the first preliminary charging, charging, and discharging switches 1130 when the charging stop signal is input and turns off a first discharging switch 1133 when the discharging stop signal is input.

Furthermore, the controller 1400 obtains the charging voltage information and the discharging voltage information from the second main switching circuit 1220 of the second power source 1200 to output the charging stop signal to the second main switching circuit 1220 when the charging voltage is determined to be the over-charging voltage and to output the discharging stop signal to the second main switching circuit 1220 when the discharging voltage is determined to be the over-discharging voltage. The second main switching circuit 1220 turns off a second charging switch when the charging stop signal is input and turns off a second discharging switch (not shown) when the discharging stop signal is input.

Furthermore, the controller 1400 controls power to be supplied to the external system 1500 to come only from one of the first power source 1100 and the second power source 1200. For example, when the controller 1400 controls the power to be supplied to the load 1510 to come only from the first power source 1100, the charging stop signal and the discharging stop signal are output to the second power source 1200 so that the second power source 1200 is not charged by the first power source 1100. The discharge of the second power source 1200 is therefore intercepted (interrupted). When the controller 1400 controls power to be supplied to the load 1510 to come only from the second power source 1200, the charging stop signal and the discharging stop signal are output to the first power source 1100 so that the first power source 1100 is not charged by the second power source 1200. Therefore, the discharge of the first power source 1100 is intercepted (interrupted). Such an operation is performed only when the load 1510 is connected to the pack positive electrode terminal P+ and the pack negative electrode terminal P−. That is, when a charging circuit 1520 is connected to the pack positive electrode terminal P+ and the pack negative electrode terminal P−, a slightly different mechanism is provided. When the charging circuit 1520 is connected, the controller 1400 sequentially or simultaneously charges the first power source 1100 and the second power source 1200.

During operation of the hybrid battery pack 1000, when it is determined that the temperature information obtained by the first temperature sensor 1160 of the first power source 1100 is higher than the allowed temperature, the controller 1400 outputs the charging stop signal or the discharging stop signal to the first main switching circuit 1120. Accordingly, the first main switching circuit 1120 intercepts (interrupts) the charging and/or discharging path (or operation). That is, the first main switching circuit 1120 turns off the first charging switch 1131 or the first discharging switch 1133.

When it is determined that the temperature information obtained by the second temperature sensor 1260 of the second power source 1200 is higher than the allowed temperature, the controller 1400 outputs the charging stop signal or the discharging stop signal to the second main switching circuit 1220. Accordingly, the second main switching circuit 1220 intercepts (interrupts) the charging and/or discharging path. That is, the second main switching circuit 1220 turns off the second charging switch (not shown) or the second discharging switch (not shown).

Figure 2A:
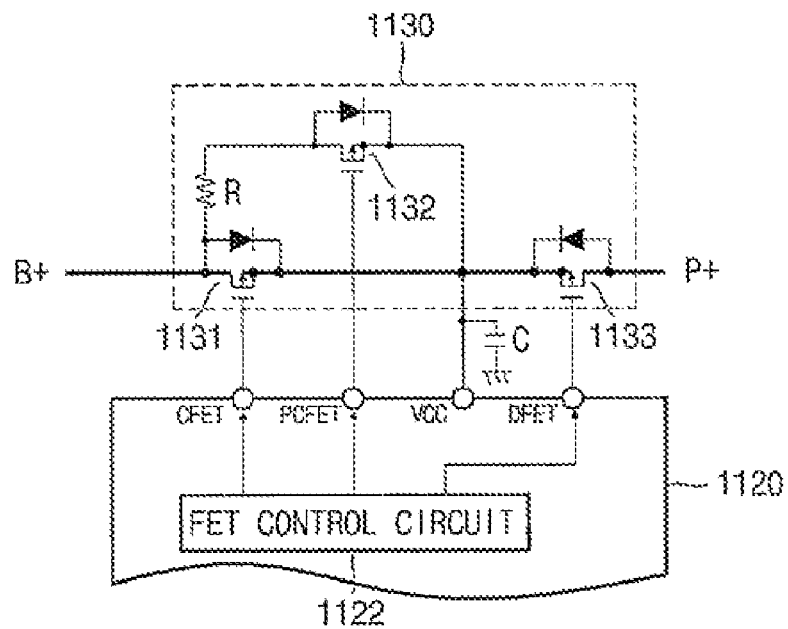
FIG. 2A is a circuit diagram illustrating a relationship between preliminary charging, charging, and discharging switches and a main switching circuit in the hybrid battery pack according to the aspect of FIG. 1.
Figure 2B:
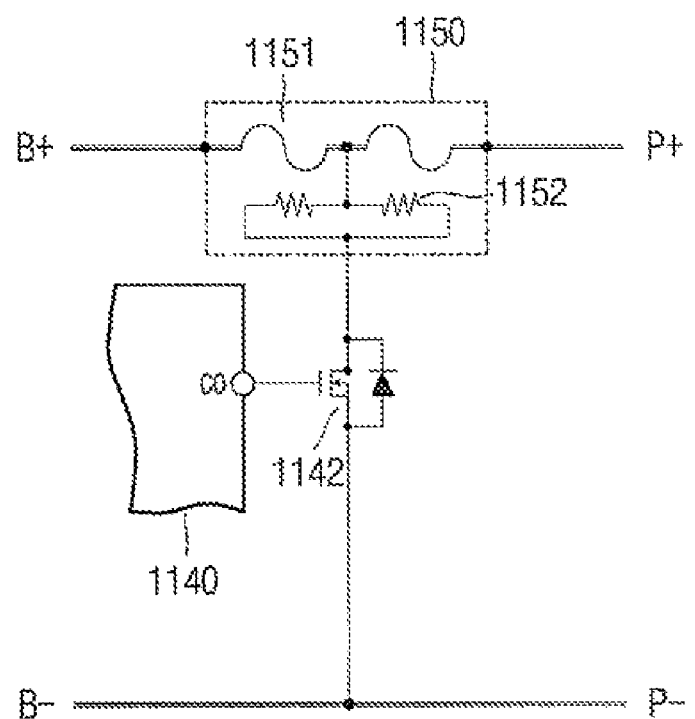
FIG. 2B is a circuit diagram illustrating a relationship between an auxiliary switching circuit and a fuse of the hybrid battery pack according to the aspect of FIG. 1.

FIG. 2A is a circuit diagram illustrating a relationship between the main switching circuit 1120 and the first preliminary charging, charging, and discharging switches 1130 in the hybrid battery pack 1000, according to the aspect of FIG. 1. FIG. 2B is a circuit diagram illustrating a relationship between the auxiliary switching circuit 1140 and the fuse 1150 of the hybrid battery pack 1000 according to the aspect of FIG. 1.

In the structure illustrated in FIG. 2A, the first main switching circuit 1120 and the first preliminary charging, charging, and discharging switches 1130 of the first power source 1100 are provided. The second power source 1200 has a corresponding structure. Therefore, description of the detailed structure and operation of the second main switching circuit 1220 and the second preliminary charging, charging, and discharging switches 1230 provided in the second power source 1200, will be omitted.

As shown in FIG. 2A, a first charging switch 1131, a first preliminary charging switch 1132, and a first discharging switch 1133 are sequentially connected to the charging and discharging path between the positive electrode terminal B+ of the first battery cell 1110 and the pack positive electrode terminal P+. That is, the first charging switch 1131 and the first discharging switch 1133 are serially connected to each other on the charging and discharging path and the preliminary charging switch 1132 is connected to the charging and discharging path in parallel. In various aspects, the switches 1131, 1132, and 1133 may be P-channel field effect transistors (FET) having forward parasite diodes, for example, from drains to sources. However, aspects of the present invention are not limited to such semiconductor devices.

As shown, the source of the first charging switch 1131 and the source of the first discharging switch 1133 are connected to each other. The drain of the first charging switch 1131 is connected to the positive electrode terminal B+ of the first battery cell 1110 and the drain of the first discharging switch 1133 is connected to the pack positive electrode terminal P+. Furthermore, the source of the first preliminary charging switch 1132 is connected to the source of the first charging switch 1131 and to the source of the first discharging switch 1133, and the drain of the first preliminary charging switch 1132 is connected to the drain of the first charging switch 1131 through a resistor R. As shown, reference numeral C is a capacitor connected in order to prevent or reduce a change in a power source.

Furthermore, the gates of the first charging switch 1131, the first preliminary charging switch 1132, and the first discharging switch 1133 are controlled by the first main switching circuit 1120. For example, when the first main switching circuit 1120 applies a low signal through a complementary field effect transistor (CFET) terminal, the first charging switch 1131 is turned on. When the first main switching circuit 1120 applies a low signal through a polymer complementary field effect transistor (PCFET) terminal, the first preliminary charging switch 1132 is turned on. When the first main switching circuit 1120 applies a low signal through a depletion-mode field effect transistor (DFET) terminal, the first discharging switch 1133 is turned on. To the contrary, when the first main switching circuit 1120 applies a high signal through the CFET terminal, the first charging switch 1131 is turned off. When the first main switching circuit 1120 applies a high signal through the PCFET terminal, the first preliminary charging switch 1132 is turned off. When the first main switching circuit 1120 applies a high signal through the DFET terminal, the first discharging switch 1133 is turned off. An FET control circuit 1122 can be built in the first main switching circuit 1120 in order to control the gate voltages of the switches 1131, 1132, and 1133.

In accordance with such a structure, when the first main switching circuit 1120 turns off the first charging switch 1131, the first battery cell 1110 stops being charged (can be discharged by the parasite diode). When the first discharging switch 1133 is turned off, the first battery cell 1110 stops being discharged (can be charged by the parasite diode). It should be understood that the first preliminary charging switch 1132 reduces a charging current when the voltage of the first battery cell 1110 is reduced to no more than the over-discharging voltage. In doing so, the first preliminary charging switch 1132 provides the reduced charging current to the battery cell for a predetermined time so that the first battery cell 1110 has a voltage as high as when charged fast. Since other details of the operations of the first charging switch 1131, the first preliminary charging switch 1132, and the first discharging switch 1133 should be well understood by those skilled in the art, description thereof will be omitted.

In FIG. 2B, the first auxiliary switching circuit 1140 and the first fuse 1150 of the first power source 1100 are schematically illustrated. The second power source 1200 has a corresponding structure. Therefore, description of the structure and operation of the second auxiliary switching circuit 1240 and the second fuse 1250 of the second power source 1200 will be omitted.

As shown in FIG. 2B, the first fuse 1150 is provided on the charging and discharging path between the positive electrode terminal B+ of the first battery cell 1110 and the pack positive electrode terminal P+ of the hybrid battery pack 1000. A first switch 1142 for operating the first fuse 1150 is connected to the charging and discharging path between the negative electrode terminal B− of the first battery cell 1110 and the pack negative electrode terminal P−. Furthermore, the first switch 1142 is connected to the CO terminal of the first auxiliary switching circuit 1140.

The first fuse 1150 includes at least one temperature fuse 1151 and a heating resistor 1152 to melt the temperature fuse 1151 to cut off (disconnect or "blow") the temperature fuse

1151. The first switch 1142 may be a common N-channel FET, however, aspects of the present invention are not limited to the N-channel FET.

During operation, when the first auxiliary switching circuit 1140 applies a high signal through the CO terminal, the first switch 1142 is turned on. Accordingly, the charging current or the discharging current flows to the negative electrode terminal B− or P− through the positive electrode terminal B+ or P+ and the drain sources of the temperature fuse 1151, the heating resistor 1152, and the switch 1142. Therefore, the heating resistor 1152 generates heat so that the temperature fuse 1151 is cut off (disconnected or "blown") and that the charging and discharging path is permanently intercepted (interrupted). The first auxiliary switching circuit 1140 operates when the first main switching circuit 1120 or the first preliminary charging, charging, and discharging switches 1130 do not operate normally.

Figure 3:
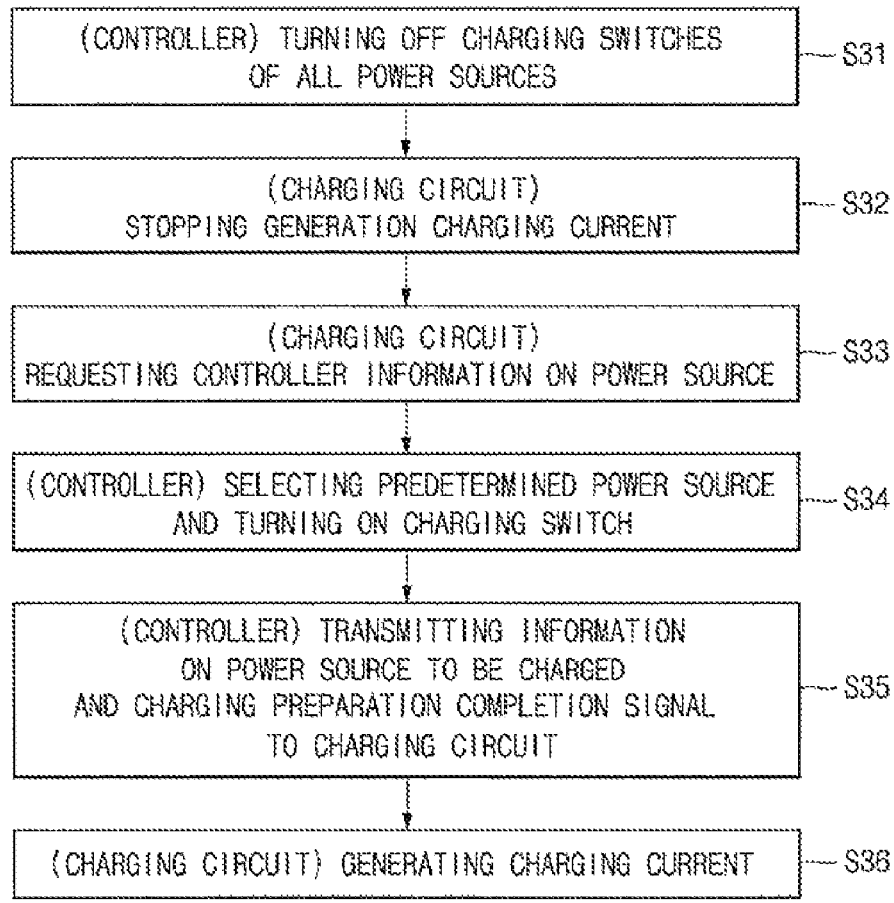
FIG. 3 is a flowchart illustrating a method of charging the hybrid battery pack according to an aspect of the present invention.

FIG. 3 is a flowchart illustrating a method of charging the hybrid battery pack 1000 according an aspect of the present invention. Accordingly, a method of initially charging a hybrid battery pack of at least two power sources and a controller to control the at least two power sources when the hybrid battery pack is connected to a charging circuit will be described.

A method of charging the hybrid battery pack 1000 according to an aspect of the present invention includes an operation (S31) of turning off charging switches by the controller 1400, an operation (S32) of stopping the generation of the charging current by the charging circuit 1520, an operation (S33) of requesting information on the power source by the charging circuit 1520, an operation (S34) of selecting a predetermined power source and of turning on the charging switch by the controller 1400, an operation (S35) of transmitting information on the power source to be charged and a charging preparation completion signal by the controller 1400, and an operation (S36) of generating the charging current by the charging circuit 1520.

To elaborate on the various operations S31-S36, in the operation (S31) of turning off the charging switch by the controller 1400, when the hybrid battery pack 1000 according to this aspect of the present invention is connected to the charging circuit 1520 in the external system 1500, all of the charging switches of the first power source 1100 and the second power source 1200 are turned off. When the hybrid battery pack 1000 is connected to the charging circuit 1520, since the hybrid battery pack 1000 and the charging circuit 1520 start to communicate with each other through the communication interface such as the SMBus, the controller 1400 can know (detect) whether it is connected to or disconnected from the charging circuit 1520.

Then, in the operation (S32) of stopping the generation of the charging current by the charging circuit 1520, the connection of the charging circuit 1520 to the hybrid battery pack 1000 is sensed by (or through) the communication interface such as the SMBus so that the charging circuit 1520 stops generating the charging current. The charging circuit 1520 may not be initially generating the charging current. However, if the charging circuit 1520 is generating the charging current, the charging circuit 1520 stops the generation of the charging current.

Then, in the operation (S33) of requesting the information on the power source by the charging circuit 1520, the external system 1500, that is, the charging circuit 1520, requests a signal that requests the information on the power source to be charged from the controller 1400 through the communication interface such as the SMBus.

Then, in the operation (S34) of selecting a predetermined power source and of turning on the charging switch by the controller 1400, the controller 1400 turns on the charging switch of the power source that is actually charged and turns off the charging switch of the power source that is not to be charged. For example, the second charging switch of the second power source 1200 is turned off and the first charging switch of the first power source 1100 is turned on.

Then, in the operation (S35) of transmitting the information on the power source to be charged and a charging preparation completion signal by the controller 1400, the controller 1400 transmits the information on the power source to be actually charged and the charging preparation completion signal to the charging circuit 1520 through the communication interface such as the SMBus. For example, the controller 1400 transmits information items on the capacity, the charging voltage, the charging current, and/or the discharging voltage of the power source to be actually charged to the charging circuit 1520. As a matter of course, the information items on the capacities, the charging voltages, the charging currents, and/or the discharging voltages of the respective power sources are previously stored in the controller 1400.

Finally, in the operation (S36) of generating the charging current by the charging circuit 1520, the charging circuit 1520 provides predetermined charging voltage and current to the pack positive electrode terminal P+ and the pack negative electrode terminal P−. For example, when the controller 1400 turns on the first charging switch 1131 of the first power source 1100 and turns off the second charging switch (not shown) of the second power source 1200, the charging current flows through the charging circuit 1520, the pack positive electrode terminal P+, the first fuse 1150, the first discharging switch 1132, the first charging switch 1131, the positive electrode terminal B+ of the first battery cell 1110, the negative electrode terminal B− of the first battery cell 1110, and the current sensor 1300. When the controller 1400 turns on the second charging switch (not shown) of the second power source 1200 and turns off the first charging switch 1131 of the first power source 1100, the charging current flows through the charging circuit 1520, the pack positive electrode terminal P+, the second fuse 1250, the second discharging switch (not shown), the second charging switch (not shown), the positive electrode terminal B+ of the second battery cell 1210, the negative electrode terminal B− of the second battery cell 1210, and the current sensor 1300.

On the other hand, during its charging operation, when the over-charging voltage of the first battery cell 1110 is sensed by the first main switching circuit 1120, the controller 1400 outputs the charging stop signal to the first main switching circuit 1120 so that the first main switching circuit 1120 turns off the first charging switch 1131.

Also, while the second power source 1200 is being charged, when the over-charging voltage of the second battery cell 1210 is sensed by the second main switching circuit 1220, the controller 1400 outputs the charging stop signal to the second main switching circuit 1220 so that the second main switching circuit 1220 turns off the second charging switch.

Furthermore, when it is determined that the temperature of the first battery cell 1110 sensed by the first temperature sensor 1160 is no less than (or at least as high as) the allowed temperature, the controller 1400 outputs the charging stop signal to the first main switching circuit 1120 so that the first power source 1100 is stopped from being charged. When the temperature of the second battery cell 1210 sensed by the second temperature sensor 1260 is no less than (or at least as high as) the allowed temperature, the controller 1400 outputs the charging stop signal to the second main switching circuit 1220 so that the second power source 1200 is stopped from being charged.

Then, the controller 1400 accumulates (coulomb counts) the charging current of the first power source 1100 and the charging current of the second power source 1200 sensed by the current sensor 1300 to calculate the charging capacity of the first power source 1100 and the charging capacity of the second power source 1200. The controller 1400 then sums the charging capacity of the first power source 1100 and the charging capacity of the second power source 1200 to calculate the entire (total or combined) charging capacity, and stores the calculated charging capacity in a memory.

Figure 4A:
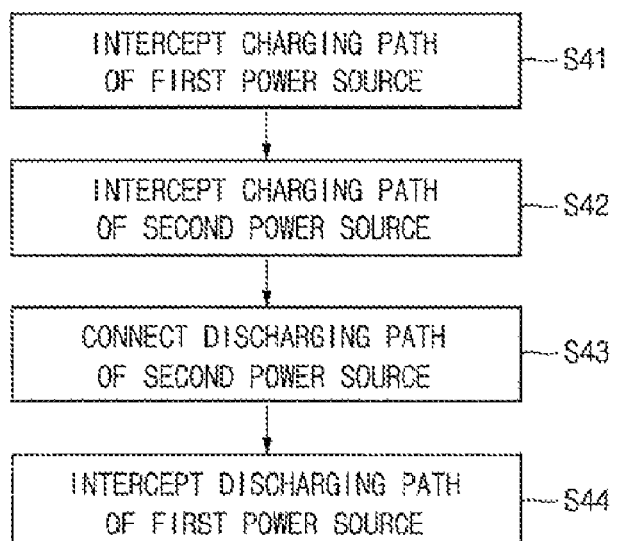
FIG. 4A is a flowchart illustrating a method of discharging the hybrid battery pack according to an aspect of the present invention.
Figure 4B:
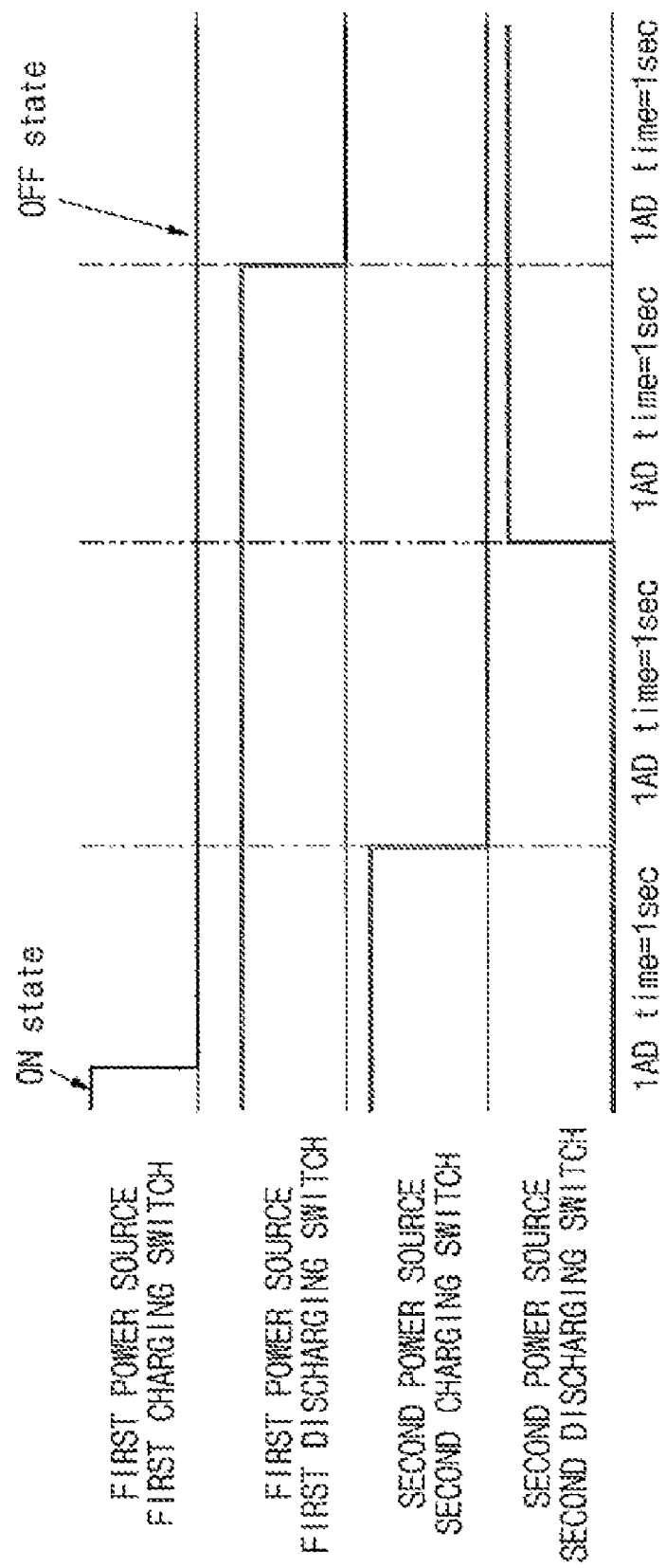
FIG. 4B is a timing chart illustrating the method of charging and discharging the hybrid battery pack according to an aspect of the present invention.

FIG. 4A is a flowchart illustrating a method of discharging the hybrid battery pack 1000 according to an aspect of the present invention. FIG. 4B is a timing chart illustrating the method of discharging the hybrid battery pack according to an aspect of FIG. 4A. In FIG. 4B, illustrated is an example in which the second power source 1200 starts to discharge the moment at which the first power source 1100 stops discharging.

As illustrated in FIG. 4A, the method of discharging the hybrid battery pack 1000 according to an aspect of the present invention includes an operation (S41) of intercepting (interrupting) the charging path (or charging current) of a power source to be stopped from being discharged, an operation (S42) of intercepting (interrupting) the charging path (or charging current) of a power source to be newly discharged, an operation (S43) of connecting a discharging path (or discharging current) of the power source to be newly discharged, and an operation (S44) of intercepting (interrupting) the discharging path (or discharging current) of the power source to be stopped from being discharged.

In detail, in the operation (S41) of intercepting the charging path of the power source to be stopped from being discharged (for example, the first power source 1100), the controller 1400 outputs the charging stop signal to the first main switching circuit 1120 so that the first main switching circuit 1120 turns off the first charging switch 1131. Therefore, the first power source 1100 is stopped from being charged by the second power source 1200. However, the first battery cell 1110 is still discharged through the parasite diode of the first charging switch 1131.

Then, in the operation (S42) of intercepting the charging path of the power source (for example, the second power source 1200) to be newly discharged, the controller 1400 outputs the charging stop signal to the second main switching circuit 1220 so that the second main switching circuit 1220 turns off the second charging switch. Therefore, the second power source 1200 is not charged by the first power source 1100. Furthermore, the second charging switch can be automatically turned off when the discharging current of the second battery cell 1210 is very small, for example, about no more than 150 mA. That is, when the discharging current of the second battery cell 1210 is small, in order to prevent power from being unnecessarily wasted, the controller 1400 outputs the charging stop signal to the first main switching circuit 1120.

Then, in the operation (S43) of connecting the discharging path of the power source (for example, the second power source 1200) to be newly discharged, the controller 1400 outputs the discharging start signal to the second main switching circuit 1220 so that the second main switching circuit 1220 turns on the second discharging switch. Therefore, the second power source 1200 supplies a predetermined power to the load 1510.

Finally, in the operation (S44) of intercepting the discharging path of the power source (for example, the first power source 1100) to be stopped from being discharged, the controller 1400 outputs the discharging stop signal to the first main switching circuit 1120 so that the first main switching circuit 1120 turns off the first discharging switch 1132. Therefore, power supply from the first power source 1100 is stopped.

Therefore, in the hybrid battery pack 1000 according to aspects of the present invention, since power supply to the load is not stopped when the discharging power source is changed, a user can continuously use an electronic apparatus without interruption of power.

In practice, the result of an aspect of the method of FIG. 4A may be as illustrated in FIG. 4B. As shown in FIG. 4B, the controller 1400 has the first charging switch 1131 of the first power source 1100 turned off about three seconds before the power supply of the first power source 1100 is stopped. Therefore, at this time, the first power source 1100 is not charged by the second power source 1200 connected through the nodes N1 and N2. However, the first power source 1100 is still discharged by the parasite diode of the first charging switch 1131.

Then, the controller 1400 has the second charging switch of the second power source 1200 turned off about two seconds before the power supply of the first power source 1100 is stopped. Therefore, at this time, the second power source 1200 is not charged by the first power source 1100 connected through the nodes N1 and N2. However, the second power source 1200 is still discharged by the parasite diode of the second charging switch.

Then, the controller 1400 has the second discharging switch of the second power source 1200 turned on about one second before the power supply of the first power source 1100 is stopped. At this time, as described above, the discharging switch 1133 of the first power source 1100 is maintained in a turned-on state. Therefore, the first power source 1100 and the second power source 1200 are discharged together for about one second.

Then, the controller 1400 has the first discharging switch 1133 of the first power source 1100 turned off about one second after the second discharging switch of the second power source 1200 is turned on. Therefore, power supply to the load 1510 by the first power source 1100 is stopped and power is supplied to the load 1510 only by the second power source 1200. Since the first power source 1100 and the second power source 1200 are together discharged for a predetermined time as described above, the power supply is not stopped or interrupted.

Then, when the over-discharging voltage of the first battery cell 1110 is sensed by the first main switching circuit 1120 during the discharging operation, the controller 1400 outputs the discharging stop signal to the first main switching circuit 1120 so that the first main switching circuit 1120 turns off the first discharging switch 1133. At the same time, the above-described operations S41 to S44 are performed so that power is continuously supplied to the load 1510 without interruption. It should be understood that the time frame between each operation need not be one minute. Accordingly, the time frame between each operation may be much less than one minute, such as a microsecond. The operations may even occur almost simultaneously.

When the second power source 1200 is being discharged, the controller 1400 senses the over-discharging voltage of the second battery cell 1210 from the second main switching circuit 1220 to output the discharging stop signal to the second main switching circuit 1220 so that the second main switching circuit 1220 turns off the second discharging switch.

Furthermore, when it is determined that the temperature of the first battery cell 1110 sensed by the first temperature sensor 1160 is no less than (or at least as high as) the allowed temperature, the controller 1400 outputs the discharging stop signal to the first main switching circuit 1120 so that the first power source 1100 is stopped from being discharged. At the same time, the above-described operations S41 to S44 are performed so that power is continuously supplied to the load 1510 without interruption. When the temperature of the second battery cell 1210 sensed by the second temperature sensor 1260 is no less than (or at least as high as) the allowed temperature, the controller 1400 outputs the discharging stop signal to the second main switching circuit 1220 so that the second power source 1200 is stopped from being discharged.

Then, the controller 1400 accumulates (or coulomb counts) the discharging current of the first power source 1100 and the discharging current of the second power source 1200 sensed by the current sensor 1300 to calculate the discharging capacity and the remaining capacity of the first power source 1100 and the discharging capacity and the remaining capacity of the second power source 1200. Also, the controller 1400 sums the discharging capacity and the remaining capacity of the first power source 1100 and the discharging capacity and the remaining capacity of the second power source 1200. The controller 1400 also calculates the entire (total or combined) discharging capacity and the remaining capacity, and also stores the entire (total or combined) discharging capacity and remaining capacity information or data in a memory. Furthermore, the controller 1400 transmits information on the entire (total or combined) discharging capacity and remaining capacity to the external load 1510 through the communication interface such as the SMBus. Accordingly, the user can correctly or accurately know the remaining capacity of the hybrid battery pack 1000 through an indicator or a display, such as a liquid crystal screen. It should be understood that since the entire (total or combined) discharging capacity is corrected (or revised) when the remaining capacity is about 7% during the discharging of the power source, and since the correcting and/or revising of the entire (total or combined) discharging capacity are well-known to those skilled in the art, descriptions thereof will be omitted.

In various aspects, the above operations may be performed in a way that the first and second power sources 1100 and 1200 are repeatedly stopped from being discharged or begin discharging while the other begins discharging or is stopped from being discharged so that power is uninterrupted.

As described above, according to aspects of the present invention, since the power sources having different shapes, chemical characteristics, capacities, and/or charging voltages are accommodated or usable, it is possible to overcome or minimize limitations on a space of the battery pack and to maximize the energy efficiency ratio per volume of the hybrid battery pack.

According to aspects of the present invention, since one controller can simultaneously manage at least two power sources, the capacities of the two power sources can be calculated, respectively, and the calculated capacities are added to an external system, it is possible to minimize the number of circuit elements and to correctly know or determine the capacities of all the power sources of a hybrid battery pack.

According to aspects of the present invention, although the shapes, the chemical characteristics, the capacities, and/or the charging voltages of the two power sources are different from each other, information on the shapes, the chemical characteristics, the capacities, and the charging voltages of the power sources to be charged during charging operations are transmitted to the charging circuit (for example, a charging capacity rate (C-rate)) and the charging circuit supplies the suitable charging current based on the information of the power sources to be charged so that the two different kinds of power sources can be easily charged, or discharged for that matter.

According to aspects the present invention, when one of the two power sources is stopped from being discharged and the other power source is to be discharged, the discharging paths of the two power sources are connected to each other for a predetermined time so that it is possible to minimize or prevent the supply of power to the external system from being stopped or interrupted.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:
1. A hybrid battery pack, comprising:
   a first power source having a first switching circuit;
   a second power source connected to the first power source in parallel and having a second switching circuit;
   a current sensor configured to sense the current of the first and second power sources; and
   a controller configured to obtain the voltages of the first and second power sources and to control the first and second switching circuits so that the first and second power sources are not over-charged or over-discharged and to calculate the capacity of the first and second power sources,
   wherein the current sensor is connected to both the first and second power sources and is directly connected to both the first and second switching circuits, wherein the controller is configured to control the first and second switching circuits based on the current sensed by the current sensor, and wherein the first and second switching circuits are configured to affect charging and discharging of the first and second power sources based on the current sensed by the current sensor.

2. The hybrid battery pack as claimed in claim 1, wherein at least one of the first power source and the second power source comprises one or more of a fuel cell, a solar cell, a cylinder type lithium ion battery, a polygon type lithium ion battery, a pouch type lithium polymer battery, and a pouch type lithium ion battery.

3. The hybrid battery pack as claimed in claim 1, wherein the first power source comprises a battery cell having at least one of a different shape, chemical characteristic, capacity, or charging voltage than a battery cell of the second power source.

4. The hybrid battery pack as claimed in claim 1, wherein the controller outputs a charging stop signal to the respective switching circuit when the voltage of the first power source or the second power source is an over-charging voltage so that the respective switching circuit stops the first power source or the second power source from being charged.

5. The hybrid battery pack as claimed in claim 1, wherein the controller outputs a discharging stop signal to the respective switching circuit when the voltage of the first power source or the second power source is an over-discharging voltage so that the respective switching circuit stops the first power source or the second power source from being discharged.

6. The hybrid battery pack as claimed in claim 1, wherein the controller obtains the temperatures of the first power source or the second power source to output a charging stop signal or a discharging stop signal to the respective switching circuit when the sensed temperatures are other than allowed temperatures so that the respective switching circuit stops the first power source or the second power source from being charged or discharged.

7. The hybrid battery pack as claimed in claim 1, wherein the first switching circuit of the first power source senses a current from the current sensor to stop the first power source from being charged or discharged during occurrence of an over-current.

8. The hybrid battery pack as claimed in claim 1, wherein the second switching circuit of the second power source senses a current from the current sensor to stop the second power source from being charged or discharged during occurrence of an over-current.

9. The hybrid battery pack as claimed in claim 1, further comprising a fuse provided in a charging and discharging path and the first power source further comprises an auxiliary switching circuit configured to blow the fuse during over-charging.

10. The hybrid battery pack as claimed in claim 1, further comprising a fuse provided on a charging and discharging path and the second power source further comprises an auxiliary switching circuit configured to blow the fuse during over-charging.

11. The hybrid battery pack as claimed in claim 1, wherein the controller sums the capacity information of the first power source and the capacity information of the second power source to transmit the summation to an external system using a communication line.

12. The hybrid battery pack as claimed in claim 1, wherein, in the first power source, a charging switch and a discharging switch are serially connected in a charging and discharging path and the switches are turned on and off by the first switching circuit.

13. The hybrid battery pack as claimed in claim 1, wherein, in the second power source, a charging switch and a discharging switch are serially connected in a charging and discharging path and the switches are turned on and off by the second switching circuit.

14. A method of controlling a hybrid battery pack comprising at least two power sources, at least two switching circuits, each connected to one of the power sources, and a controller configured to control power supplied from a charging circuit to charge the hybrid battery pack, the method comprising:
electrically opening charging paths of all power sources;
stopping the charging circuit from generating a charging current;
requesting from the controller information on which of the power sources is to be charged;
selecting a power source to be charged based on a capacity of the power sources calculated with information from a current sensor connected to each of the power sources and directly connected to each of the switching circuits, and connecting the selected power source to the charging circuit;
transmitting information on the selected power source to be charged and a charging preparation completion signal to the charging circuit;
generating a charging current with the charging circuit;
supplying the charging current to the selected power source; and
discontinuing the charging current with the switching circuit connected to the selected power source based on a signal from the current sensor.

15. A method of controlling a hybrid battery pack comprising at least two power sources, at least two switching circuits, each connected to one of the power sources, and a controller configured to control power supplied to a load to discharge the hybrid battery pack, the method comprising:
electrically opening a charging path of one of the power sources to electrically disconnect the one power source from the load;
selecting a power source to be discharged based on a capacity of the power sources calculated with information from a current sensor connected to each of the power sources and directly connected to each of the switching circuits;
electrically opening a charging path of the selected power source to electrically disconnect the selected power source from the load;
electrically connecting the selected power source to the load with a discharging path;
electrically opening a discharging path of the one power source to electrically disconnect the one power source from the load; and
discontinuing the discharging current with the switching circuit connected to the selected power source based on a signal from the current sensor.

16. The method as claimed in claim 15, wherein the controller simultaneously connects the discharging paths of the two power sources to the load if the discharging paths are changed from the one power source to the selected power source.

17. The hybrid battery pack as claimed in claim 1, wherein the controller coulomb counts the respective currents of the first power source and the second power source to calculate the respective charging capacities of the first and second power sources.

* * * * *